United States Patent
Berrington et al.

(10) Patent No.: US 9,928,250 B2
(45) Date of Patent: Mar. 27, 2018

(54) SYSTEM AND METHOD FOR MANAGING DEDUPLICATION USING CHECKPOINTS IN A FILE STORAGE SYSTEM

(71) Applicant: Hitachi Data Systems Engineering UK Limited, Bracknell, Berkshire (GB)

(72) Inventors: Neil Berrington, San Jose, CA (US); Namita Lal, Palo Alto, CA (US); Gaurav Sharma, San Jose, CA (US)

(73) Assignee: HITACHI DATA SYSTEMS ENGINEERING UK LIMITED, Berkshire (GB)

( * ) Notice: Subject to any disclaimer, the term of this patent is extended or adjusted under 35 U.S.C. 154(b) by 0 days.

(21) Appl. No.: 15/045,946

(22) Filed: Feb. 17, 2016

(65) Prior Publication Data
US 2016/0162509 A1    Jun. 9, 2016

Related U.S. Application Data

(63) Continuation of application No. 14/429,185, filed as application No. PCT/US2012/056032 on Sep. 19, 2012.

(51) Int. Cl.
*G06F 7/00* (2006.01)
*G06F 17/00* (2006.01)
*G06F 17/30* (2006.01)
*G06F 11/14* (2006.01)
*G06F 3/06* (2006.01)

(52) U.S. Cl.
CPC ...... *G06F 17/30159* (2013.01); *G06F 3/0641* (2013.01); *G06F 11/1453* (2013.01); *G06F 17/30088* (2013.01); *G06F 17/30097* (2013.01); *G06F 17/30174* (2013.01)

(58) Field of Classification Search
None
See application file for complete search history.

(56) References Cited

U.S. PATENT DOCUMENTS

| 6,826,615 | B2 | 11/2004 | Barrall et al. ............... 709/227 |
| 7,457,822 | B1 | 11/2008 | Barrall et al. ............ 707/104.1 |
| 8,032,498 | B1 * | 10/2011 | Armangau ........ G06F 17/30088 707/690 |
| 8,041,735 | B1 | 10/2011 | Lacapra et al. ............... 707/783 |
| 8,171,063 | B1 * | 5/2012 | Janakiraman ..... G06F 17/30159 707/692 |

(Continued)

OTHER PUBLICATIONS

"*Permabit Albireo Data Optimization Software, Virtual Data Optimizer (VDO ) for Linux*", (White Paper) Permabit Technology Corporation , 7 pages, Aug. 2012.

(Continued)

*Primary Examiner* — David T Brooks
(74) *Attorney, Agent, or Firm* — Mattingly & Malur, PC

(57) ABSTRACT

A deduplication system and method involves interaction between a software-based system that manages the overall background deduplication process and a hardware-based system that includes a hardware-based filesystem manager and a hash generator. A filesystem checkpoint mechanism is leveraged to manage the background deduplication process and also to reduce processing complexity with respect to identifying chunks that are candidates for deduplication and processing such chunks.

30 Claims, 5 Drawing Sheets

(56) References Cited

U.S. PATENT DOCUMENTS

| | | | |
|---|---|---|---|
| 8,180,897 B2 | 5/2012 | Barrall et al. | 709/227 |
| 8,224,877 B2 | 7/2012 | Barrall et al. | 707/821 |
| 8,407,193 B2 | 3/2013 | Gruhl et al. | 707/693 |
| 8,543,609 B1 * | 9/2013 | Natanzon | G06F 3/0605 707/791 |
| 8,595,188 B2 | 11/2013 | Gruhl et al. | 707/646 |
| 8,782,003 B1 * | 7/2014 | Patterson | G06F 17/30144 707/624 |
| 8,843,459 B1 | 9/2014 | Aston et al. | 707/694 |
| 8,898,114 B1 * | 11/2014 | Feathergill | G06F 17/30159 707/648 |
| 8,930,653 B1 * | 1/2015 | Chatterjee | G06F 11/1453 711/154 |
| 9,009,429 B2 * | 4/2015 | Kapanipathi, Sr. | G06F 3/0608 711/162 |
| 2008/0005201 A1 * | 1/2008 | Ting | G06F 11/1435 |
| 2009/0182785 A1 * | 7/2009 | Aston | G06F 17/3023 |
| 2009/0192978 A1 | 7/2009 | Hewett et al. | 707/1 |
| 2010/0094817 A1 * | 4/2010 | Ben-Shaul | G06F 3/0608 707/697 |
| 2010/0114842 A1 * | 5/2010 | Forman | G06F 17/3033 707/692 |
| 2011/0178996 A1 * | 7/2011 | Pendlebury | G06F 11/1453 707/692 |
| 2011/0258404 A1 * | 10/2011 | Arakawa | G06F 3/0608 711/162 |
| 2012/0017060 A1 * | 1/2012 | Kapanipathi | G06F 3/0608 711/162 |
| 2012/0130949 A1 * | 5/2012 | Picken | G06F 17/30174 707/626 |
| 2013/0054927 A1 * | 2/2013 | Raj | G06F 3/0608 711/170 |
| 2013/0086007 A1 * | 4/2013 | Bandopadhyay | G06F 17/30156 707/692 |

OTHER PUBLICATIONS

"*NetApp Deduplication for FAS and V-Series Deployment and Implementation Guide—TR-3505-0309*", NetApp, Inc. 40 pages, Mar. 2009.

International Searching Authority International Search Report—International Application No. PCT/US2012/056032, dated Feb. 15, 2013, together with the Written Opinion of the International Searching Authority, 16 pages.

Chinese Office Action received in corresponding Chinese Application No. 201280075854.5 dated Aug. 24, 2016.

* cited by examiner

SYSTEM AND METHOD FOR MANAGING DEDUPLICATION USING CHECKPOINTS IN A FILE STORAGE SYSTEM

CROSS-REFERENCE TO RELATED APPLICATION(S)

This application is a continuation of, and therefore claims priority from, U.S. patent application Ser. No. 14/429,185 entitled SYSTEM AND METHOD FOR MANAGING DEDUPLICATION USING CHECKPOINTS IN A FILE STORAGE SYSTEM filed on Mar. 18, 2015, which is a U.S. national phase application filed under 35 U.S.C. 371 of, and therefore claims priority from, International Application No. PCT/US2012/056032 filed Sep. 19, 2012; each of these patent applications is hereby incorporated herein by reference in its entirety.

FIELD OF THE INVENTION

The present invention relates generally to file storage systems, and, more particularly, to deduplication in file storage systems.

BACKGROUND OF THE INVENTION

Deduplication is a mechanism for improving storage utilization. It mainly involves identifying duplicate chunks of data in a data storage system and eliminating the duplicates while maintaining only a single copy of that data along with references to this single copy. Among other things, deduplication reduces the amount of space required to store the data, e.g., on disk and/or solid-state storage.

SUMMARY OF EXEMPLARY EMBODIMENTS

In a first exemplary embodiment there is provided a method of deduplicating data in a file storage system running a live filesystem, the file storage system having a software-based system and a hardware-based system, the software-based system including a software-based deduplication manager that is configured to interface with a deduplication detection/indexing engine, the hardware-based system including a hardware-based filesystem manager and a hash generator, the live filesystem delineated by a series of checkpoints. The method involves making a snapshot copy of the filesystem by the software-based deduplication manager; determining, by the software-based deduplication manager, a checkpoint range for deduplication; identifying, by the software-based deduplication manager, a candidate chunk in the snapshot copy based on the checkpoint range; requesting, by the software-based deduplication manager to the hardware-based filesystem manager, hashing of the candidate chunk using the hash generator, the hardware-based filesystem manager returning a hash value and chunk metadata for the candidate chunk to the software-based deduplication manager; sending the hash value of the candidate chunk by the software-based deduplication manager to the deduplication detection/indexing engine and receiving chunk metadata for a previously indexed chunk by the software-based deduplication manager from the deduplication detection/indexing engine when the candidate chunk matches the previously indexed chunk; requesting, by the software-based deduplication manager to the hardware-based filesystem manager, deduplication of the candidate chunk based on the chunk metadata for the previously indexed chunk; verifying, by the hardware-based filesystem manager, based on the chunk metadata, whether the candidate chunk can be deduplicated in the live filesystem using the previously indexed chunk; and upon determining that the candidate chunk can be deduplicated in the live filesystem using the previously indexed chunk, replacing each of a number of pointers associated with the candidate chunk with a corresponding pointer associated with the previously indexed chunk.

In a second exemplary embodiment there is provided a file storage system that runs a live filesystem that is delineated by a series of checkpoints. The filestorage system includes a software-based system including a software-based deduplication manager that is configured to interface with a deduplication detection/indexing engine and a hardware-based system including a hardware-based filesystem manager and a hash generator. The software-based deduplication manager is configured to (1) make a snapshot copy of the filesystem, (2) determine a checkpoint range for deduplication, (3) identify a candidate chunk in the snapshot copy based on the checkpoint range, (4) request that the hardware-based filesystem manager hash the candidate chunk using the hash generator, the hardware-based filesystem manager returning a hash value and chunk metadata for the candidate chunk to the software-based deduplication manager, (5) send the hash value of the candidate chunk to the deduplication detection/indexing engine and receive chunk metadata for a previously indexed chunk from the deduplication detection/indexing engine when the candidate chunk matches the previously indexed chunk, and (6) request that the hardware-based filesystem manager deduplicate the candidate chunk based on the chunk metadata for the previously indexed chunk. The hardware-based filesystem manager is configured to (1) verify, based on the chunk metadata, whether the candidate chunk can be deduplicated in the live filesystem using the previously indexed chunk and (2) upon determining that the candidate chunk can be deduplicated in the live filesystem using the previously indexed chunk, replace each of a number of pointers associated with the candidate chunk with a corresponding pointer associated with the previously indexed chunk.

In various alternative embodiments, the candidate chunk may encompass a single filesystem block from a given filesystem object or may encompass a plurality of filesystem blocks from a given filesystem object.

In various alternative embodiments, verifying whether the candidate chunk can be deduplicated in the live filesystem may be based at least in part on a checkpoint number associated with the candidate chunk and a checkpoint number associated with the previously indexed chunk and/or may be based at least in part on a reference count associated with a block of the previously indexed chunk.

In various alternative embodiments, replacing each of a number of pointers associated with the candidate chunk with a corresponding pointer associated with the previously indexed chunk may involve increasing a reference count associated with each corresponding pointer.

In various alternative embodiments, identifying a candidate chunk in the snapshot copy based on the checkpoint range may involve examining a creation checkpoint in a root node of a filesystem object and determining whether the filesystem object includes any candidate chunks based at least in part on the creation checkpoint. Determining whether the filesystem object includes any candidate chunks may involve, when the creation checkpoint is within the checkpoint range and the filesystem object is not a cloned object, determining that all chunks associated with the filesystem object are candidate chunks; when the creation checkpoint is within the checkpoint range and the filesystem object is a cloned object, traversing an object tree structure to identify any chunks that have diverged from an original object from which the filesystem object was cloned; and when the creation checkpoint is outside of the checkpoint range, traversing the object tree structure to identify any chunks that have modification checkpoints within the checkpoint range. Alternatively, determining whether the filesystem object includes any candidate chunks may involve, when the creation checkpoint is within the checkpoint range, the filesystem object is not a cloned object, and the filesystem object is not a sparse object, determining that all chunks associated with the filesystem object are candidate chunks; when the creation checkpoint is within the checkpoint range, the filesystem object is not a cloned object, and the filesystem object is a sparse object, traversing an object tree structure to identify any candidate chunks that are not sparse; when the creation checkpoint is within the checkpoint range and the filesystem object is a cloned object, traversing the object tree structure to identify any candidate chunks that have diverged from an original object from which the filesystem object was cloned; and when the creation checkpoint is outside of the checkpoint range, traversing the object tree structure to identify any candidate chunks that have modification checkpoints within the checkpoint range.

In any of the above embodiments, the candidate chunk may be indexed based on the hash value and the chunk metadata associated with the candidate chunk when the previously indexed chunk is determined to be unavailable for deduplication.

In a another exemplary embodiment there is provided apparatus comprising a tangible, non-transitory computer readable medium having embodied therein a computer program for deduplicating data in a file storage system running a live filesystem, the live filesystem delineated by a series of checkpoints, the computer program including instructions that, when run on a computer processor of the file storage system, causes the computer processor to perform processes comprising making a snapshot copy of the filesystem; determining a checkpoint range for deduplication; identifying a candidate chunk in the snapshot copy based on the checkpoint range; transmitting a request to a hardware-based filesystem manager for hashing of the candidate chunk; receiving from the hardware-based filesystem manager a hash value and chunk metadata for the candidate chunk; determining whether the candidate chunk is a duplicate of a previously indexed chunk based on the hash value; and when the candidate chunk is determined to be a duplicate of a previously indexed chunk, transmitting a request to the hardware-based filesystem manager for deduplication of the candidate chunk, the request including chunk metadata for the previously indexed chunk.

In yet another exemplary embodiment there is provided apparatus for deduplicating data in a file storage system running a live filesystem, the live filesystem delineated by a series of checkpoints, the apparatus comprising a hash generator and a hardware-based filesystem manager configured to receive a request from a software-based deduplication manager for hashing of a candidate chunk, determine whether to hash the candidate chunk based on a checkpoint number associated with the candidate chunk, invoke the hash generator to hash the chunk upon determining to hash the candidate chunk, return a hash value and chunk metadata for the candidate chunk to the software-based deduplication manager, receive from the software-based deduplication manager a request for deduplication of the candidate chunk, verify whether the candidate chunk can be deduplicated in the live filesystem based on the previously indexed chunk, and, upon determining that the candidate chunk can be deduplicated in the live filesystem using the previously indexed chunk, replacing each of a number of pointers associated with the candidate chunk with a corresponding pointer associated with the previously indexed chunk.

In still another exemplary embodiment there is provided a method for identifying candidate chunks for deduplication in a file storage system having a live filesystem including a plurality of filesystem objects, the live filesystem delineated by a series of checkpoints, the deduplication relating to a predetermined checkpoint range. The method involves examining a creation checkpoint in a root node of a filesystem object and determining whether the filesystem object includes any candidate chunks based at least in part on the creation checkpoint, including, when the creation checkpoint is within the checkpoint range, the filesystem object is not a cloned object, and the filesystem object is not a sparse object, determining that all chunks associated with the filesystem object are candidate chunks; when the creation checkpoint is within the checkpoint range, the filesystem object is not a cloned object, and the filesystem object is a sparse object, traversing an object tree structure to identify any candidate chunks that are not sparse; when the creation checkpoint is within the checkpoint range and the filesystem object is a cloned object, traversing the object tree structure to identify any candidate chunks that have diverged from an original object from which the filesystem object was cloned; and when the creation checkpoint is outside of the checkpoint range, traversing the object tree structure to identify any candidate chunks that have modification checkpoints within the checkpoint range.

Additional embodiments may be disclosed and claimed.

BRIEF DESCRIPTION OF THE DRAWINGS

The foregoing features of embodiments will be more readily understood by reference to the following detailed description, taken with reference to the accompanying drawings, in which.

It should be noted that the foregoing figures and the elements depicted therein are not necessarily drawn to consistent scale or to any scale. Unless the context otherwise suggests, like elements are indicated by like numerals.

DETAILED DESCRIPTION OF SPECIFIC EMBODIMENTS

Figure 1:
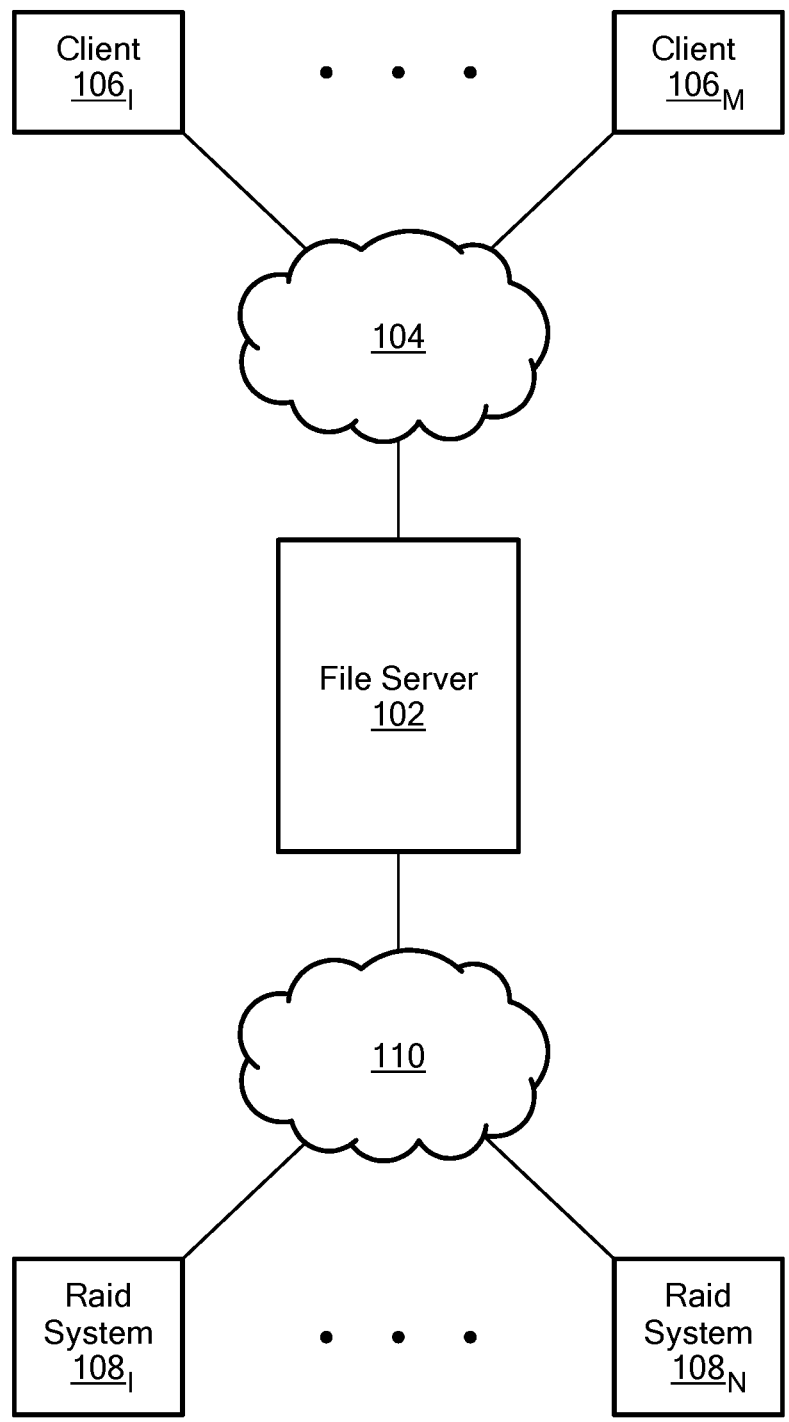
FIG. 1 is a schematic block diagram of a file storage system in accordance with an exemplary embodiment of the present invention.

As used in this description and the accompanying claims, the following terms shall have the meanings indicated, unless the context otherwise requires:

A "storage device" is a device or system that is used to store data. A storage device may include one or more magnetic or magneto-optical or optical disk drives, solid state storage devices, or magnetic tapes. For convenience, a storage device is sometimes referred to as a "disk" or a "hard disk." A data storage system may include the same or different types of storage devices having the same or different storage capacities.

A "RAID controller" is a device or system that combines the storage capacity of several storage devices into a virtual piece of storage space that may be referred to alternatively as a "system drive" ("SD"), a "logical unit" ("LU" or "LUN"), or a "volume." Typically, an SD is larger than a single storage device, drawing space from several storage devices, and includes redundant information so that it can withstand the failure of a certain number of disks without data loss. In exemplary embodiments, each SD is associated with a unique identifier that is referred to hereinafter as a "logical unit identifier" or "LUID," and each SD will be no larger than a predetermined maximum size, e.g., 2 TB-64 TB or more. When commands are sent to an SD, the RAID controller typically forwards the commands to all storage devices of the SD at the same time. The RAID controller helps to overcome three of the main limitations of typical storage devices, namely that the storage devices are typically the slowest components of the storage system, they are typically the most likely to suffer catastrophic failure, and they typically have relatively small storage capacity.

A "RAID system" is a device or system that includes one or more RAID controllers and a number of storage devices. Typically, a RAID system will contain two RAID controllers (so that one can keep working if the other fails, and also to share the load while both are healthy) and a few dozen storage devices. In exemplary embodiments, the RAID system is typically configured with between two and thirty-two SDs. When a file server needs to store or retrieve data, it sends commands to the RAID controllers of the RAID system, which in turn are responsible for routing commands onwards to individual storage devices and storing or retrieving the data as necessary. With some RAID systems, mirror relationships can be established between SDs such that data written to one SD (referred to as the "primary SD") is automatically written by the RAID system to another SD (referred to herein as the "secondary SD" or "mirror SD") for redundancy purposes. The secondary SD may be managed by the same RAID system as the primary SD or by a different local or remote RAID system. Mirroring SDs effectively provides RAID 1+0 functionality across SDs in order to provide recovery from the loss or corruption of an SD or possibly even multiple SDs in some situations.

A "filesystem" is a structure of files and directories (folders) stored in a file storage system. Within a file storage system, filesystems are typically managed using a number of virtual storage constructs, and in exemplary embodiments, filesystems are managed using a hierarchy of virtual storage constructs referred to as ranges, stripesets, and spans. A "range" is composed of either a primary SD on its own or a primary/secondary SD pair that are supposed to contain identical data and therefore offer the same storage capacity as a single SD. A "stripeset" is composed of one or more ranges. A "span" is composed of one or more stripesets. Thus, a span is ultimately composed of one or more SDs (typically four to fifty SDs). A span can be divided into one or more filesystems, with each filesystem having a separate name and identifier and potentially different characteristics (e.g., one filesystem may be formatted with 32 KB clusters and another with 4 KB clusters, one filesystem may be Worm and another not, etc.). Each filesystem on the span is formatted, mounted, and unmounted separately. Filesystems may be created and deleted in any order and at any time. Filesystems typically can be configured to expand automatically (or alternatively to prevent or restrict auto-expansion) or can be expanded manually.

A "block" is a unit of storage in the filesystem that corresponds to portion of physical storage in which user data and/or system data is stored. A filesystem object (discussed below) generally includes one or more blocks.

A "chunk" is a conceptual unit of storage in the filesystem that encompasses one or more blocks of a filesystem object. In exemplary embodiments described herein, deduplication is performed on a chunk basis.

A "set" of values may include one or more values.

Headings are used below for convenience and are not to be construed as limiting the present invention in any way.

Exemplary embodiments of the present invention are described with reference to an exemplary filesystem of the type used in various file servers sold by Hitachi Data Systems and known generally as BlueArc Titan™ and Mercury™ file servers, although it should be noted that various concepts may be applied to other types of filesystems.

Exemplary File Storage System

FIG. 1 is a schematic block diagram of a file storage system in accordance with an exemplary embodiment of the present invention. Among other things, the file storage system includes a number of file servers (a single file server 102 is shown for the sake of simplicity and convenience) in communication with various client devices $106_1$-$106_m$ over a communication network 104 such as an Internet Protocol network (e.g., the Internet) and also in communication with various RAID systems $108_1$-$108_N$ over a storage network 110 such as a FibreChannel network. The client devices $106_1$-$106_m$ and the file server 102 communicate using one or more network file protocols, such as CIFS and/or NFS. The file server 102 and the RAID systems $108_1$-$108_N$ communicate using a storage protocol, such as SCSI. It should be noted that the file storage system could include multiple file servers and multiple RAID systems interconnected in various configurations, including a full mesh configuration in which any file server can communicate with any RAID system over a redundant and switched FibreChannel network.

The file server 102 includes a storage processor for managing one or more filesystems. The file server 102 can be configured to allow client access to portions of the filesystems, such as trees or sub-trees under designated names. In CIFS parlance, such access may be referred to as a "share" while in NFS parlance, such access may be referred to as an "export." Internally, the file server 102 may include various hardware-implemented and/or hardware-accelerated subsystems, for example, as described in U.S. Pat. No. 6,826,615 and U.S. Pat. No. 8,180,897, each of which is hereby incorporated herein by reference in its entirety, and may include a hardware-based filesystem including a plurality of linked sub-modules, for example, as described in U.S. Pat. No. 7,457,822 and U.S. Pat. No. 8,224,877, each of which is hereby incorporated herein by reference in its entirety.

Each RAID system 108 typically includes at least one RAID controller (and usually two RAID controllers for redundancy) as well as a number of physical storage devices (e.g., disks) that are managed by the RAID controller(s). The RAID system 108 aggregates its storage resources into a number of SDs. For example, each RAID system 108 may be configured with between 2 and 32 SDs. Each SD may be limited to a predetermined maximum size (e.g., 2 TB-64 TB or more). Combining several storage devices into an SD can provide a number of benefits, including increased speed (individual storage devices are relatively slow, but data can be striped across several storage devices to widen the bottleneck), increased capacity (individual storage devices are comparatively small, but several storage devices can be combined to provide more usable space), abstraction (the amount of space used can be either larger or smaller than the size of a single storage device), and resilience (parity or redundancy information can be stored on each storage device so that the SD can withstand the loss of a storage device).

The file server 102 is configured to use one or more SDs, which can be from a single RAID system or from multiple RAID systems. The file server 102 can normally interrogate the RAID systems to find out whether each SD is primary or secondary. The method of controlling which SDs are used by the file server 102 is referred to herein as "licensing." Thus, in practice, the file server 102 will typically be licensed for some SDs and unlicensed for others.

Internally, the file server 102 is capable of combining several SDs into a larger storage pool referred to herein as a "span." A span is essentially a RAID 0 array of several SDs. Combining several SDs into a span can provide a number of benefits similar to those obtained by combining multiple physical disks into an SD, including increased speed (spreading I/O between multiple SDs on multiple RAID systems can widen the storage bottleneck further), increased storage capacity (the span can be larger than a single SD, which may be limited to two terabytes), and additional abstraction, which allows for more flexible storage space allocation.

Software/Hardware Architecture

Figure 2:
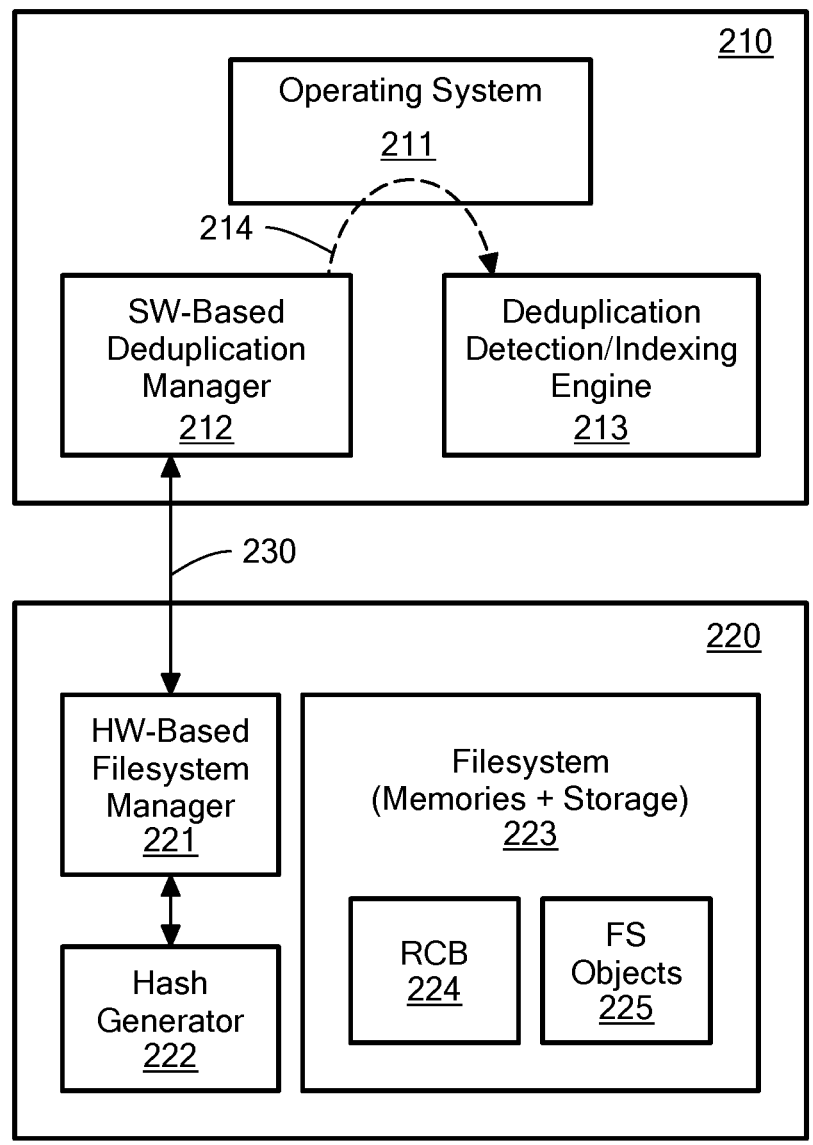
FIG. 2 is a schematic diagram of a software/hardware architecture in accordance with such an exemplary embodiment.

In certain exemplary embodiments, the file server implements deduplication through a unique division of labor between a software-based system and a hardware-based system. FIG. 2 is a schematic diagram of a software/hardware architecture in accordance with such an exemplary embodiment. Here, the software-based system 210 includes various software components including a software-based deduplication manager 212 and a deduplication detection/indexing engine 213 that run under an operating system 211 running on a microprocessor system (e.g., including a microprocessor and associated memories and peripherals). An inter-process communication channel 214 (e.g., via a Bossock socket layer) is provided to allow for communication between the software-based deduplication manager 212 and the deduplication detection/indexing engine 213. The hardware-based system 220 includes various hardware components including a hardware-based filesystem manager 221 in communication with a hardware-based hash generator 222 (discussed more fully below) and with a filesystem 223 that is stored in various memories and storage devices, some of which may be within the file server 102 (e.g., in an internal cache memory) and some of which may be outside of the file server 102 (e.g., stored in various RAID systems or other storage systems). An interface 230 is provided to allow for communication between the software-based deduplication manager 212 and the hardware-based filesystem manager 221.

Among other things, the division of labor depicted in FIG. 2 allows the software-based deduplication manager 212 to direct deduplication functions in the background so as to control the impact deduplication has on the performance of the hardware-based filesystem and also reduces the amount of communication between the software-based and hardware-based components. Both the software-based deduplication manager 212 and the hardware-based filesystem manager 221 include various optimizations that reduce the amount of processing and communication required to perform deduplication, as discussed below.

Filesystem Objects and Tree Structure

The file server 102 stores various types of objects in the filesystem. The objects may be classified generally as system objects and file objects. File objects are created for storage of user data and associated attributes, such as a word processor or spreadsheet files. System objects are created by the file storage system for managing information and include such things as root directory objects, free-space allocation objects, modified checkpoint objects list objects, modified retained objects list objects, and software metadata objects, to name but a few. More particularly, directory objects are created for storage of directory information. Free-space allocation objects are created for storage of free-space allocation information. Modified checkpoint objects list objects and modified retained objects list objects (both of which are described in more detail below) are created for storage of information relating to checkpoints and retained checkpoints, respectively. A software metadata object (which is described in more detail below) is a special object for holding excess file attributes associated with a file or directory object (i.e., file attributes that cannot fit within pre-designated areas within the file or directory object as described below, such as CIFS security attributes), and is created by the creator of the file or directory object, which includes a reference to the software metadata object within the file or directory object.

In certain embodiments, an instantiation of the filesystem is managed using a tree structure having a root node (referred to as a dynamic superblock or DSB). The file server 102 may maintain multiple DSBs to store different versions of the filesystem representing different checkpoints (e.g., a current "working" version and one or more "checkpoint" versions). In one exemplary embodiment, the DSB includes a pointer to an indirection object, which in turn includes pointers to other objects. Each object referenced by the indirection object is associated with an object number. System objects typically have fixed, predefined object numbers, since they generally always exist in the system. File objects are typically assigned object numbers dynamically from a pool of available object numbers, and these file object numbers may be reused in some circumstances (e.g., when a file is deleted, its object number may be freed for reuse by a subsequent file object). The indirection object can be indexed by object number in order to obtain a pointer to the corresponding object.

Generally speaking, each object in the filesystem, including the indirection object, each of the system objects, and each of the file objects, is implemented using a separate tree structure that includes a separate object root node (sometimes referred to as a root onode) and optionally includes a number of indirect nodes (sometimes referred to as an indirect onode), direct nodes (sometimes referred to as a direct onode), and storage blocks. The DSB includes a pointer to the root node of the indirection object. The indirection object includes pointers to the root nodes of the other objects.

Figure 3:
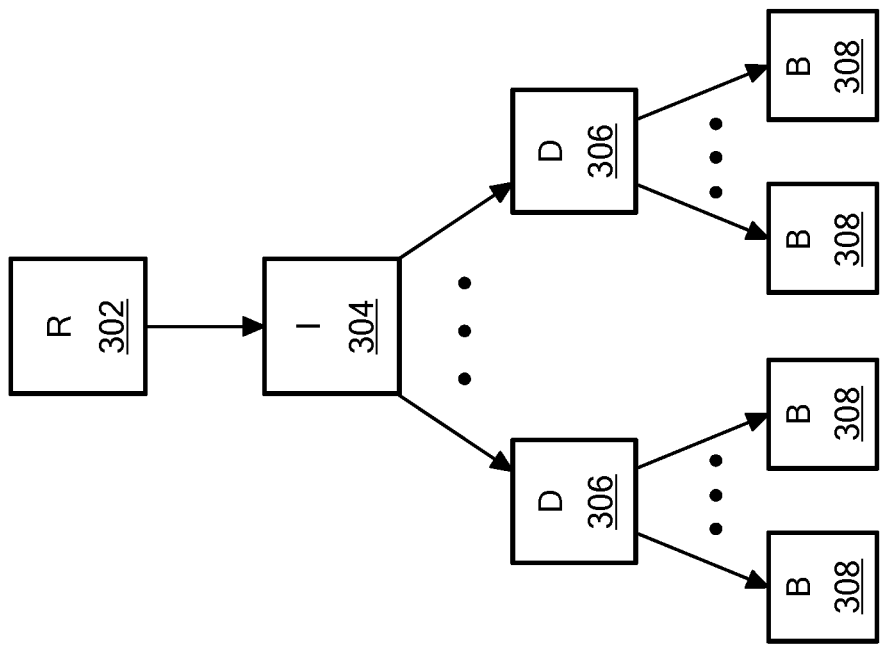
FIG. 3 is a schematic block diagram showing the general format of an object tree structure in accordance with an exemplary embodiment of the present invention.

FIG. 3 is a schematic block diagram showing the general format of an object tree structure in accordance with an exemplary embodiment of the present invention. A root ("R") node 302 may point to various indirect ("I") nodes 304, each of which may point to a number of direct ("D")

nodes 306, each of which may point to a number of storage blocks ("B") 308. In practice, object tree structures can vary widely, for example, depending on the size of the object. Also, the tree structure of a particular object can vary over time as information is added to and deleted from the object. For example, nodes may be dynamically added to the tree structure as more storage space is used for the object, and different levels of indirection may be used as needed (e.g., an indirect node can point to direct nodes or to other indirect nodes).

When an object is created, an object root node is created for the object. Initially, the root node of such an "empty" object has no pointers to any indirect nodes, direct nodes, or data blocks.

As data is added to the object, it is first of all put into data blocks pointed to directly from the root node. Once all the direct block pointers in the root node are filled, then a direct node is created with a pointer from the root node to the direct node. If the data in the object grows to fill all the data pointers in the direct node, then an indirect node is created.

A checkpoint mechanism, for example, as described in U.S. Pat. No. 7,457,822, which was incorporated by reference above, and in U.S. Pat. No. 8,041,735, which is hereby incorporated herein by reference in its entirety, is included to make temporary copies and optional retained copies of the filesystem at various times. Specifically, the processing of file system requests is delineated by a series of checkpoints that are scheduled to occur no less frequently than some user-specified interval, such as every 10 seconds. With respect to each successive checkpoint, there is stored, on disk, current file structure information that supersedes previously stored file structure information from the immediately preceding checkpoint. Checkpoints are numbered sequentially and are used to temporally group processing of file requests. Each filesystem object is associated with the checkpoint in which it is created, and the creation checkpoint number is stored in the object root node.

For a variety of purposes it may be useful to have knowledge of the file system structure at a selected point in time. This capability is provided by permitting storage of file system structure data associated with the currently saved checkpoint, which is referred to hereinafter for convenience as a retained checkpoint or snapshot. The retained checkpoint is essentially a read-only version of the file system structure at a particular checkpoint. Multiple retained checkpoints can be taken, and mechanisms are included for deleting a selected retained checkpoint or reverting the file system to a selected retained checkpoint (for example, to return the file system to a known state following a catastrophe).

In certain embodiments of the present invention, a file cloning mechanism, for example, as described in U.S. Patent Application Publication No. US 2012/0130949, which is hereby incorporated herein by reference in its entirety) is included to allow for quickly creating copies (clones) of files within a filesystem, such as when a user makes a copy of a file. In exemplary embodiments, a clone of a source object is at least initially represented by a structure containing references to various elements of the source object (e.g., indirect onodes, direct onodes, and data blocks). Both read-only and mutable clones can be created. The source file and the clone initially share such elements and continue to share unmodified elements as changes are made to the source file or mutable clone. None of the user data blocks or the metadata blocks describing the data stream (i.e., the indirect/direct onodes) associated with the source file need to be copied at the time the clone is created. At appropriate times, cloned files may be "de-cloned."

The object root node includes a checkpoint number to identify the checkpoint in which the object was last modified (the checkpoint number initially identifies the checkpoint in which the object was created and thereafter the checkpoint number changes each time the object is modified in a new checkpoint). In an exemplary embodiment, the checkpoint number at which the object was created is also stored in the object root node.

For the actual data to which the object root node corresponds, the object root node includes a separate pointer to each block of data associated with the corresponding object. In general, pointers to up to 16 data blocks are stored in the object root node. For data going beyond 16 blocks, one or more direct nodes and/or direct nodes are needed in the object tree, with appropriate pointers stored as needed in each node to link the various nodes. Such pointers store the sector number of the on-disk block associated with the corresponding data block or node.

The direct node includes a checkpoint number and is arranged to store the locations of a certain number of blocks (e.g., about 60 or 61 blocks) pertinent to the object.

When a first direct node is fully utilized to identify data blocks, then one or more indirect node are used to identify the first direct node as well as additional direct nodes that have blocks of data corresponding to the object. In such a case, the object root node has a pointer to the indirect node, and the indirect node has pointers to corresponding direct nodes. When an indirect node is fully utilized, then additional intervening indirect nodes are employed as necessary. This structure permits fast identification of a part of a file, regardless of the file's fragmentation.

As discussed above, the indirect node provides a level of indirection between the root node and the direct node. The following information is stored in the indirect node in one exemplary embodiment:

The checkpoint number.

Pointers to either indirect or direct nodes (e.g., up to 60 such pointers).

A CRC and various sanity dwords to allow the indirect node to be checked for validity.

As discussed above, the direct node provides direct pointers to data blocks on the disk. The following information is stored in the direct node in one exemplary embodiment:

The checkpoint number.

A number of data block descriptors (e.g., up to 60 such descriptors). Each data block descriptor includes a pointer to a data block, the checkpoint number, and a bit to say whether the block is zero filled.

A CRC and various sanity dwords to allow the indirect node to be checked for validity.

Within each node (i.e., root, indirect, direct), each pointer to a block or other node is associated with a checkpoint number to indicate the checkpoint associated with the block/node referenced by the pointer. In certain exemplary embodiments described below, these checkpoint numbers are used to determine whether a particular filesystem object chunk should be investigated for possible deduplication.

Notwithstanding the above description of how the filesystem object tree structures are managed, with data blocks and tree nodes allocated a populated as the object is written, certain exemplary embodiments support sparse filesystem objects in which a filesystem object may be written without having to allocate all data blocks and tree nodes, and for some zero-filled portions of an object, without having to zero-fill data block(s).

For example, if a write to a file has a start offset beyond the current end of the file, then the undefined portion of the file between the current end and the start of the new write data technically must be filled with zeroes. The same thing occurs if the length of the object is set to be greater than the current length. This can be particularly problematic if a file is created and then the length is set to be, say, 1 GB. Fully allocating the data blocks for such a filesystem object would require that the disk blocks allocated to the object actually be written with zeroes. For a 1 GB file, this could take of the order of, say, 10 seconds. For a 1 TB file, it could take of the order of, say 3 hours.

In certain embodiments of the present invention, this problem is avoided by having a bit with each data block pointer to say whether that block is zero filled. If this bit is set, then the file server knows that this block should be filled with zeroes, even though on disk it may contain non-zero data. If the block is read, then zeros are returned for this block rather than the actual on-disk contents. If the block is written to with a write that does not fill the entire block, then zeros are written to portions of the block that are not being written, and the bit is reset in order to indicate that the block is not zero-filled. Note that, in this case, disk blocks will be allocated for all zero-filled portions of the file, although the disk blocks will not actually be filled with zeros.

In some instances, data blocks and related tree nodes are not even allocated for such zero-filled portions of a filesystem object, since the allocation of the data blocks and tree nodes can take an excessive amount of time. For example, with a disk block size of 4K, a 1 TB object requires approximately 4 million direct onodes as well as a lesser number of indirect onodes, which could take on the order of 40 seconds to write to disk. Also the free space allocation of all the data blocks required, and the subsequent updates to the free space bitmap, would significantly add to this time. If a checkpoint were to be taken immediately after the file creation begins, the entire system generally would stop servicing requests (to any volumes) for the whole of this time.

This, in certain exemplary embodiments, this problem is solved by a twofold approach. The first aspect of the solution is not to actually allocate disk blocks for the zero filled portions of the file. This means that when the object store sees a write to a zero filled block it would first have to allocate disk space for that block and put a pointer to it in the relevant onode structure.

The second aspect builds on the first and involves, in addition to not allocating the data blocks, not creating the onode structure either. To implement this aspect, each onode pointer has a bit to say whether the onode it points to is allocated or not. If not, then when an operation comes along which requires that onode to be valid, only then is disk space allocated for it and the correct pointer inserted. In this way, a huge zero filled object can have only a root onode, which obviously can be created very quickly.

Merely for the sake of example, the following shows representations of the types of information contained in a root node and a next-level node referenced from the root node (annotations are underlined and in parentheses):

Sample root node of a file:

onode/ccache: onode -o 16392
onode/ccache: Read 1024 bytes from sector 0x38b560 (Byte Offset 0x716ac000 )
onode/ccache:
onode/ccache: ActiveRootNode
onode/ccache: AsciiDescriptor:   RONA
onode/ccache: SanityDWord0:      WFS1 (valid)
onode/ccache: ObjectNumber:      0x4008 (Type: OBJ_TYPE_FSOBJECT_FILE)
onode/ccache: Checkpoint:        0x123ab (The checkpoint number whenthis
                                          object was last modified)
onode/ccache: ReuseCount:        0x123ab
onode/ccache: WriteCount:        0x3
onode/ccache: IndirectionCount:  2
onode/ccache: ResiliencyMode:    None
onode/ccache: DataLength:        1 MB (1048576 B)
onode/ccache: FreeRootOnodePtr:  0x0 (unused)
onode/ccache: SavedRootOnodePtr: 0x0 (unused)
onode/ccache: BlockPtr[00]:      0x38d0c8 (Checkpoint: 0x123ab) (Pointer to a
                                           data block written at checkpoint0x123ab)
onode/ccache: BlockPtr[01]:      (Checkpoint: 0x123ab) (ZeroFill) (Sparse)
onode/ccache: BlockPtr[02]:      (Checkpoint: 0x123ab) (ZeroFill) (Sparse)
onode/ccache: BlockPtr[03]:      (Checkpoint: 0x123ab) (ZeroFill) (Sparse)
onode/ccache: BlockPtr[04]:      (Checkpoint: 0x123ab) (ZeroFill) (Sparse)
onode/ccache: BlockPtr[05]:      (Checkpoint: 0x123ab) (ZeroFill) (Sparse)
onode/ccache: BlockPtr[06]:      (Checkpoint: 0x123ab) (ZeroFill) (Sparse)
onode/ccache: BlockPtr[07]:      (Checkpoint: 0x123ab) (ZeroFill) (Sparse)
onode/ccache: BlockPtr[08]:      (Checkpoint: 0x123ab) (ZeroFill) (Sparse)
onode/ccache: BlockPtr[09]:      (Checkpoint: 0x123ab) (ZeroFill) (Sparse)
onode/ccache: BlockPtr[10]:      (Checkpoint: 0x123ab) (ZeroFill) (Sparse)
onode/ccache: BlockPtr[11]:      (Checkpoint: 0x123ab) (ZeroFill) (Sparse)
onode/ccache: BlockPtr[12]:      (Checkpoint: 0x123ab) (ZeroFill) (Sparse)
onode/ccache: BlockPtr[13]:      (Checkpoint: 0x123ab) (ZeroFill) (Sparse)

```
onode/ccache: BlockPtr[14]:      (Checkpoint: 0x123ab) (ZeroFill) (Sparse)
onode/ccache: BlockPtr[15]:      (Checkpoint: 0x123ab) (ZeroFill) (Sparse)
onode/ccache: LeafOnodePtr:      0x38b5c0 (Checkpoint: 0x123ab) (Additional
                                 onode tree that points at remaining datablocks)
onode/ccache: Format TimeStamp:  0x5034155431d149c3
onode/ccache: WfsEnode
onode/ccache: <Enode contains file's attributes - snipped>
onode/ccache:
onode/ccache: Cloned Checkpoint: 0x0 (If this object is a cloneofanother
                                 object, the Cloned Checkpoint will benon-zero)
onode/ccache: Reserved[1]:       0x0
onode/ccache: Reserved[2]:       0x0
onode/ccache: BlockCount:        0x100 (sparse blocks)
onode/ccache: CreationChkpoint:  0x123ab (The checkpoint in which thisobject
                                 was created)
onode/ccache: Crc32:             0xcbe306ba (valid)
onode/ccache: SanityDWord1:      WFS2 (valid)
Sample next level in the onode tree:

onode/ccache: onode -s 0x38b5c0
onode/ccache: Read 1024 bytes from sector 0x38b5c0 ( Byte Offset 0x716b8000 )
onode/ccache: Leaf Onode:
onode/ccache: IndirectOnode
onode/ccache: AsciiDescriptor:   IONA
onode/ccache: SanityDWord0:      WFS1 (valid)
onode/ccache: ObjectNumber:      0x4008 (Type:
OBJ_TYPE_FSOBJECT_FILE)
onode/ccache: Checkpoint:        0x123ab (The checkpoint when this nodewas
                                 written, which must match the checkpoint fieldinthe
                                 pointer to this node - in this example,theleafonode
                                 pointer from the root onodeabove)
onode/ccache: ReuseCount:        0x123ab
onode/ccache: WriteCount:        0x3
onode/ccache: ResiliencyMode:    None
onode/ccache: ObjectPtr[00]:     0x38b5b8 (Checkpoint: 0x123ab) (Pointer to the
                                 first next branch of thetree)
onode/ccache: ObjectPtr[01]:     0x38b5c8 (Checkpoint: 0x123ab) (Pointer to the
                                 second next branch of thetree)
onode/ccache: ObjectPtr[02]:     0x38b5d0 (Checkpoint: 0x123ab) (Pointer to the
                                 third next branch of thetree)
onode/ccache: ObjectPtr[03]:     0x38b5d8 (Checkpoint: 0x123ab) (Pointer to the
                                 fourth next branch of thetree)
onode/ccache: Reserved[0]:       0x0
onode/ccache: Reserved[1]:       0x0
onode/ccache: Reserved[2]:       0x0
onode/ccache: Crc32:             0x25972e2f (valid)
onode/ccache: SanityDWord1:      WFS2(valid)
```

Deduplication Detection/Indexing Engine

Although embodiments of the present invention are not limited to any particular deduplication detection/indexing engine, in certain exemplary embodiments, the deduplication detection/indexing engine 213 is a commercially available software product known as ALBIREO™ data optimization software licensed from Permabit Technology Corporation of Cambridge, Mass. (referred to hereinafter as "the engine"), which is provided as a precompiled shared library and an executable and is integrated into the software-based system 210.

The engine supports two types of indexing, namely sparse indexing and default indexing. Indexing is based on a SHA-256 hash of the chunk. Both index types use a four-byte in-memory entry per indexed chunk as well as an on-disk data structure in which information about chunks is recorded as (and in the order that) they are presented to the engine. This on-disk data structure is used to store application-specific information about each chunk (referred to hereinafter as "chunk metadata" and discussed more fully below). In certain exemplary embodiments, sparse indexing is used, since sparse indexing may be preferred for a background deduplication process in which chunks are not necessarily processed for deduplication in temporal order (i.e., in the order in which the chunks were actually modified) even though such temporal locality is generally considered preferable. Preferably (but not necessarily), the on-disk data structure is stored within the filesystem to which it relates, which allows the on-disk data structure to move automatically with the filesystem both during EVS and filesystem migration.

Checkpoint-Based Deduplication

At a very high level, the deduplication process involves identifying chunks that are candidates for deduplication, determining whether a particular candidate chunk is a duplicate of another chunk in the filesystem, and replacing a duplicate chunk with a reference to the other chunk such that the candidate chunk (and hence the duplicate data) need not be stored. Other candidate chunks that also are duplicates of that other chunk also may be replaced with a reference to that other chunk so as to further reduce the amount of data that is stored.

Certain exemplary embodiments of the present invention leverage the filesystem checkpoint mechanism to manage the background deduplication process and also to reduce processing complexity with respect to identifying chunks that are candidates for deduplication and processing such chunks.

One way in which checkpoints are leveraged in certain embodiments is by the software-based deduplication manager performing deduplication as a background function in successive deduplication cycles, where the deduplication cycles are run at various times (which may be scheduled, performed under certain conditions such as after a predetermined number of blocks have been modified or after a predetermined number of checkpoints have been taken, or manually-initiated) and each cycle covers a predetermined range of checkpoint numbers that are not necessarily sequential. In one exemplary embodiment, at every checkpoint, the number of blocks that were changed since the prior checkpoint is tracked and accumulated, and the number of blocks that were changed in the filesystem since the last deduplication cycle is used to determine when to start a deduplication cycle. If the software-based deduplication manager determines that deduplication has fallen behind the live filesystem by a predetermined amount (e.g., more than a predetermined number of blocks have been modified since the last checkpoint range that was deduplicated), then the software-based deduplication manager may omit deduplication of a number of checkpoint ranges in order to "catch up" with the live filesystem. Checkpoint numbers also are used by the software-based deduplication manager to reduce the amount of processing needed to detect candidate chunks and by the hardware-based filesystem manager to reduce the amount of processing needed to verify a match for deduplication and also to perform the actual deduplication of a duplicate chunk. The use of checkpoints is discussed in more detail below.

The following description of an exemplary deduplication process assumes that each chunk encompasses a single filesystem block, and thus, for this exemplary embodiment, the terms "chunk" and "block" are essentially interchangeable. Later, some considerations for more general embodiments are described in which each chunk can encompass multiple filesystem blocks.

Figure 4:
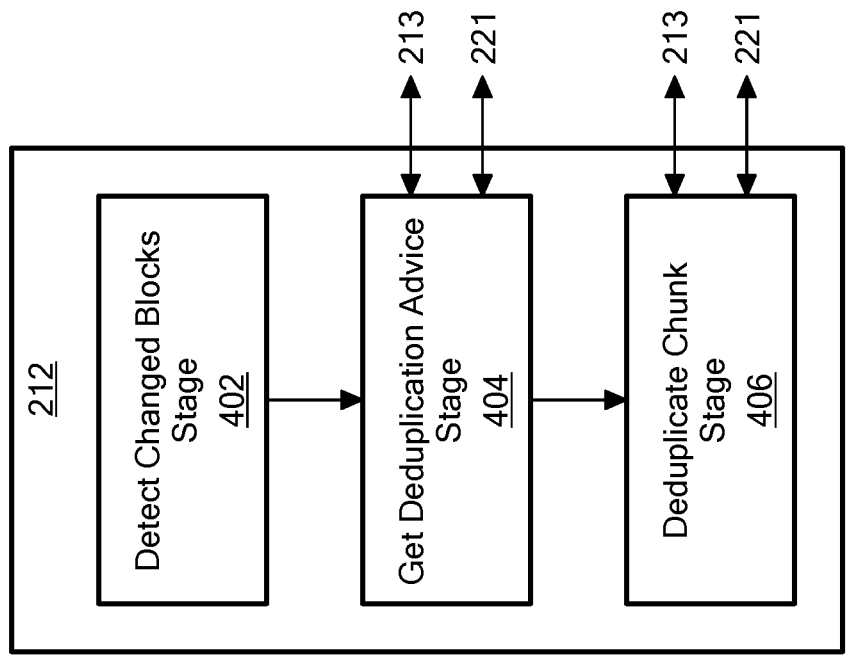
FIG. 4 is a schematic diagram showing components of the software-based deduplication manager in accordance with one exemplary embodiment.

In certain exemplary embodiments, the software-based deduplication manager 212 uses a "pipeline" architecture that is divided into three i stages, as shown schematically in FIG. 4. Here, the software-based deduplication manager 212 includes a "Detect Changed Blocks" stage 402, a "Get Deduplication Advice" stage 404, and a "Deduplicate Chunk" stage 406. In this exemplary embodiment, each stage issues asynchronous requests from a single thread.

Figure 5:
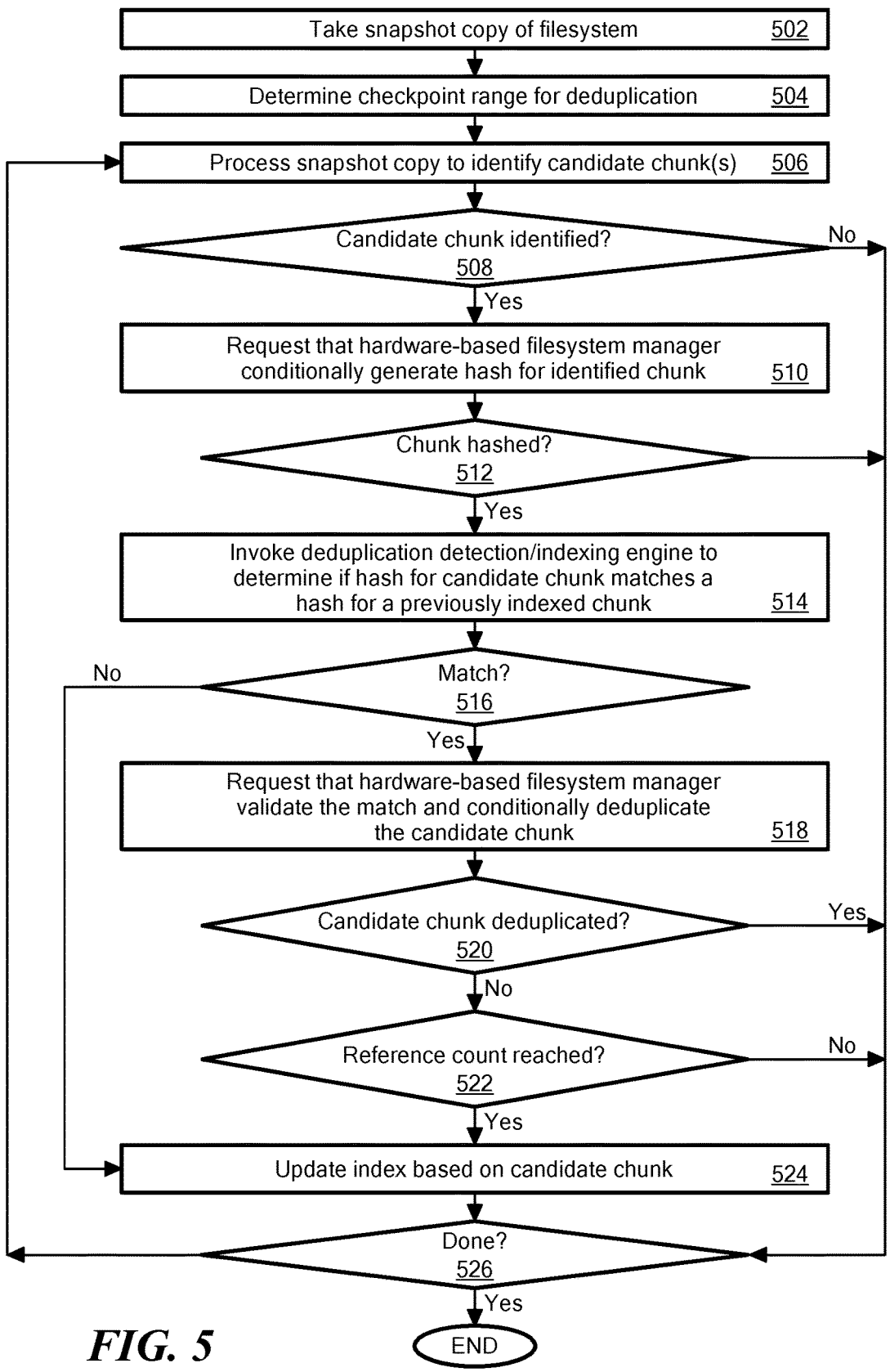
FIG. 5 is a schematic logic flow diagram for deduplication, in accordance with certain exemplary embodiments of the present invention.

FIG. 5 is a schematic logic flow diagram for deduplication, in accordance with certain exemplary embodiments of the present invention.

Generally speaking, as a background function, the software-based deduplication manager 212 takes a snapshot of the filesystem, in block 502, and determines a checkpoint range for deduplication, in block 504. The checkpoint range includes a base checkpoint number (referred to as "checkpoint-low") and an upper checkpoint number (referred to as "checkpoint-high"), where checkpoint-high is typically the checkpoint number associated with the snapshot and checkpoint-low is a predetermined past checkpoint that may or may not be the same as the checkpoint-high value of the immediately previous iteration of deduplication. A job is posted to the 'Detect Changed Blocks' queue containing a filesystem identifier (which allows for supporting deduplication of multiple filesystems, as discussed below), an object number where this deduplication cycle should begin, the number of objects that should be checked in a single job, the base checkpoint number (checkpoint-low), and the upper checkpoint number (checkpoint-high).

The Detect Changed Blocks thread pool/process 402 of the software-based deduplication manager 212 processes the "snapshot" copy of the filesystem to identify chunks that were modified within the predetermined checkpoint range and hence are candidates for deduplication, in block 506. Exemplary processes for identifying candidate chunks are discussed below.

When a candidate chunk is found (YES in block 508), the Detect Changed Blocks stage 402 posts a job to the Get Deduplication Advice stage 404 including relevant information regarding the candidate chunk (e.g., the block pointer and checkpoint of the chunk). In block 510, the Get Deduplication Advice stage 404 sends a request to the hardware-based filesystem manager 221 via interface 230 to conditionally (i.e., subject to certain restrictions discussed below) read the candidate chunk(s) from storage and compute a hash of the candidate chunk(s) using the hardware-based hash generator 222.

Before reading/hashing a particular candidate chunk, the hardware-based filesystem manager 221 decides whether or not to read and hash the candidate chunk, since, for example, the filesystem object associated with the candidate chunk may have been deleted or truncated to exclude the candidate chunk since the snapshot copy of the filesystem used by the software-based deduplication manager 212 was taken, or the chunk may have been modified since the snapshot copy of the filesystem used by the software-based deduplication manager 212 was taken. In the first two cases, no hash value need be computed for the candidate chunk, thereby saving processing resources and reducing communication between the software-based deduplication manager and the hardware-based filesystem manager. In the latter case, if the candidate chunk is at the same checkpoint it was at in the "snapshot" copy, then the hardware-based filesystem manager 221 computes a hash value for the candidate chunk and passes the hash value and associated chunk metadata to the software-based deduplication manager as discussed above.

Assuming the hardware-based filesystem manager 221 decides to read/hash the candidate chunk, then the hardware-based filesystem manager 221 invokes the hash generator 222 to generate the hash and then passes the hash along with relevant chunk metadata for the candidate chunk (including, among other things, the object number, checkpoint number, etc.) back to the Get Deduplication Advice stage 404. As opposed to having the software-based deduplication manager 212 request the entire candidate chunk (which, in one exemplary embodiment, may be 32 Kbytes) and performing the hashing within the software-based system 210 (e.g., by the software-based deduplication manager 212 or by the deduplication detection/indexing engine 213), this mechanism reduces communication between the software-based system 210 and the hardware-based system 220 by passing the hash value and related chunk metadata (which, in one exemplary embodiment, is on the order of 64 bytes of information—a 256-bit hash value plus up to 32 bytes of chunk metadata) rather than the entire candidate chunk and also reduces the load on the microprocessor in the software-based system 210 by performing the hashing function in hardware.

Assuming the candidate chunk was hashed (YES in block 512), then, in block 514, the Get Deduplication Advice stage 404 invokes the deduplication indexing/matching engine 213 via the interface 214 to determine if the hash value matches the hash of a previously indexed chunk. If the hash of the candidate chunk does not match the hash a previously indexed chunk (NO in block 516), then the Get Deduplication Advice stage 404 typically instructs the deduplication detection/indexing engine 213 to index the candidate chunk by storing the chunk metadata received from the hardware-based filesystem manager 221 for that hash value (i.e., the candidate chunk becomes the previously indexed chunk for future duplicate detection). If, on the other hand, the hash of the candidate chunk does match the hash of a previously indexed chunk (YES in block 516), then the deduplication indexing/matching engine 213 returns the stored chunk metadata for the previously indexed chunk to the Get Deduplication Advice stage 404, which in turn posts a job to the Deduplicate Chunk thread pool/process 406.

The Deduplicate Chunk stage 406 locks the object associated with the previously indexed chunk (based on the chunk metadata returned by the deduplication detection/indexing engine 213) and sends a request to the hardware-based filesystem manager 221 to verify the match and conditionally deduplicate the candidate chunk based on the chunk metadata returned by the deduplication detection/indexing engine 213, in block 518.

When the hardware-based filesystem manager 221 is informed that the candidate chunk matched a previously indexed chunk, the hardware-based filesystem manager 221 must decide whether or not to deduplicate the candidate chunk, since relevant information in the live filesystem may have changed since the snapshot copy of the filesystem used by the software-based deduplication manager 212 was taken and even since the hash was generated so as to make the previously indexed chunk and/or the candidate chunk obsolete for deduplication purposes. For example, by the time the software-based deduplication manager identifies the candidate chunk as a duplicate, the object associated with the candidate chunk may have been deleted from the live filesystem, the object associated with the candidate chunk may have been truncated so that the candidate chunk is no longer part of the object, or the candidate chunk may have been modified. Thus, match of the candidate chunk is only tentative and must be validated before the candidate chunk can be deduplicated. Therefore, the hardware-based filesystem manager 221 validates both the previously-indexed chunk and the candidate chunk using checkpoint numbers, specifically by comparing the previously-indexed block pointer's current checkpoint with the checkpoint returned in the chunk metadata from the index to ensure that the two blocks are unchanged and still in-use and, therefore, available for deduplication.

Even if the previously indexed chunk is otherwise available for deduplicating the candidate chunk, the hardware-based filesystem manager 221 in certain exemplary embodiments might not deduplicate the candidate chunk if the block associated with the previously indexed chunk is already referenced (i.e., shared) a predetermined maximum number of times. Thus, in such an exemplary embodiment, a limit may be placed on the number of times a particular block can be referenced (i.e., shared). In this exemplary embodiment, the hardware-based filesystem manager 221 checks a reference count (discussed below) for the block to determine if the maximum reference count has been reached. If the maximum reference count has been reached, indicating that the candidate chunk cannot be deduplicated using the block from the previously indexed chunk, then the hardware-based filesystem manager 221 informs the Deduplicate Chunk stage 406.

Assuming the hardware-based filesystem manager 221 determines that the candidate chunk can be deduplicated, then, among other things, the hardware-based filesystem manager 221 replaces the reference to the candidate chunk in the corresponding filesystem object with a reference to the previously indexed chunk, increases the reference count associated with the previously indexed chunk, and marks the candidate chunk to be freed so as to reduce the amount of storage space needed for the filesystem object.

If the candidate chunk was successfully deduplicated by the hardware-based filesystem manager 221 (YES in block 520), then if there are objects remaining to be processed (NO in block 526), the process essentially returns to block 506. If, however, the candidate chunk was not successfully deduplicated by the hardware-based filesystem manager 221 (NO in block 520), and such failure to deduplicate the candidate chunk was due to the previously indexed chunk having reached its maximum reference count so as to be unavailable to deduplicate the candidate chunk as discussed more fully below (YES in block 522), then, in block 524, the Deduplicate Chunk thread stage 406 typically instructs the deduplication detection/indexing engine 213 to index the candidate chunk by storing the chunk metadata received from the hardware-based filesystem manager 221 for that hash value (i.e., the candidate chunk becomes the previously indexed chunk for future duplicate detection). Whether or not the candidate chunk was deduplicated, and whether or not the index was updated based on the candidate chunk, if there are objects remaining to be processed (NO in block 526), the process essentially returns to block 506.

Identifying Candidate Chunks

Figure 6:
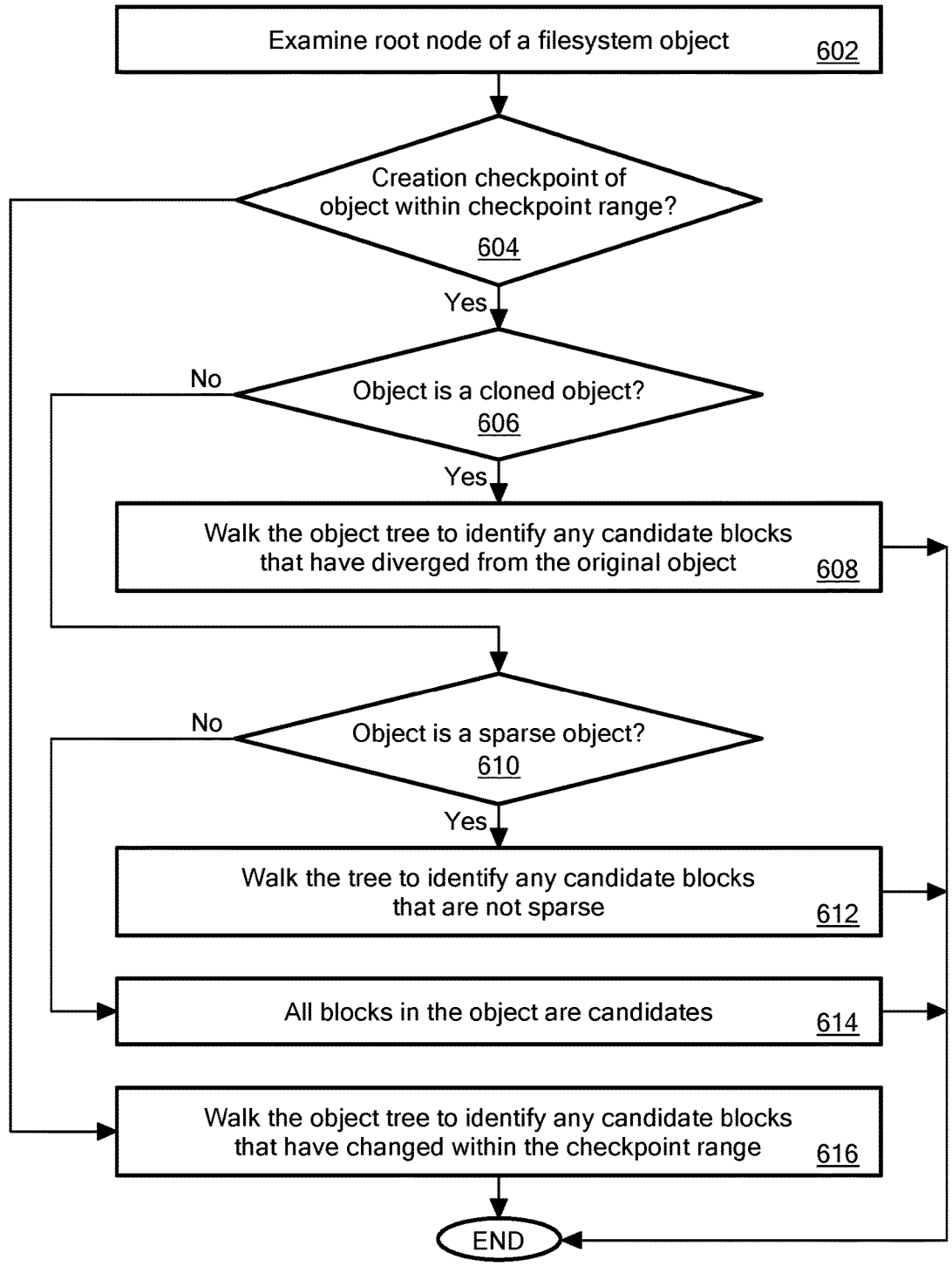
FIG. 6 is a logic flow diagram for identifying candidate chunks, in accordance with one exemplary embodiment.

As discussed above, the Detect Changed Blocks stage 402 will have to identify changes in a filesystem in order to try deduplicating them. In certain exemplary embodiments, the software-based deduplication manager 212 iterates over the indirection object, identifying changed objects and then changed blocks within such changed objects using checkpoint numbers. FIG. 6 is a logic flow diagram for identifying candidate chunks, in accordance with one exemplary embodiment. Here, the Detect Changed Blocks stage 402 examines the root node of a filesystem object, in block 602. If the creation checkpoint of the object is within the checkpoint range (YES in block 604), then, unless the object is a cloned object (discussed below), all blocks associated with the filesystem object will have changed within that checkpoint range and therefore all blocks of the filesystem object typically will be considered candidate chunks (optionally with an exception, discussed below).

If the filesystem object is a cloned object (YES in block 606), then only blocks of the filesystem object that have diverged from the original object (i.e., the object from which this object was cloned) will be considered candidate chunks, so the Detect Changed Blocks stage 402 "walks" (i.e., traverses) the object tree to identify any candidate blocks that have diverged from the original object, in block 608. Such diverged blocks will have checkpoint numbers greater than the cloned-in-checkpoint number of the object, which is stored in the object root node.

If the filesystem object is not a cloned object (NO in block 606) but the object is a sparse object (YES in block 610), then, rather than treating all blocks of the object as candidate chunks (where some of the blocks may be unallocated), the software-based deduplication manager 212 optionally may "walk" the object tree to find only blocks that have been allocated and written and treat those blocks as candidate chunks, in block 612.

If the creation checkpoint of the object is within the checkpoint window and the object is not a clone and the object is not sparse (in embodiments in which sparse objects are handled as described above), then the Detect Changed Blocks stage 402 treats all blocks of the object as candidate chunks, in block 614.

If the creation checkpoint of the object is less than the bottom of the checkpoint range (NO in block 604), then the Detect Changed Blocks thread pool/process 402 "walks" the object tree to identify any candidate blocks that have changed within the checkpoint range, in block 616.

Additionally or alternatively, in various alternative embodiments, the hardware-based filesystem manager 221 may maintain a changed objects list and/or a changed blocks list, and the Detect Changed Blocks stage 402 may use such list(s) to identify changes in the filesystem within a given checkpoint range.

Data Packing

In certain exemplary embodiments, in order to conserve storage space, the system may allow for multiple data segments (e.g., onodes and/or user data segments that are smaller than a full block) from the same filesystem object or from different filesystem objects to be packed into a single block, as opposed to storing each data segment in a separate block as is typically done. For example, up to a predetermined number of onodes may be stored in a single block, or multiple data segments (even data associated with more than one filesystem object) may be stored in a single block.

For example, when storage space is requested for a data segment, rather than requesting and obtaining an entire block for the data segment, the system may request and obtain one or more sectors for the data segment, where a sector is not necessarily at the start of a block boundary and may be allocated from an existing partially filled block, and hence multiple data segments may share a single block. The sectors may be allocated in fixed-sized increments for certain type of data segments (e.g., leaf onodes are fixed-size) or may be allocated in variable-sized increments for other types of data segments (e.g., variable-size user data segments). Such a packed block is essentially shared by (and hence referenced by) multiple entities, and, similar to the way a block may be shared by (and hence referenced by) multiple entities due to deduplication, such a packed block cannot be deleted until all of the data segments contained in the block have been deleted. Thus, similar to the sharing of blocks due to deduplication, the system must be able to track the number of references associated with such a packed block, e.g., using the same reference count mechanism used for deduplication and described in more detail below. When a data segment is added to the block, the reference count is incremented, and when a data segment is removed from the block, the reference count is decremented.

In certain specific exemplary embodiments, root onodes would be stored in separate blocks and would not be packed in order to avoid modification to certain utilities that process root onodes (e.g., a "fixfs" utility), although fixed-sized leaf onodes and variable-sized data blocks may be packed. With regard to packing of data blocks, if there is not enough space in an existing partially-filled block to store a given data segment, then typically the data segment would be stored in a new block rather than storing part of the data segment in the existing partially-filled block and the remainder of the data segment in a new block, although certain embodiments may allow for such "splitting" of the data segment.

It should be noted that packed blocks may be deduplicated in a manner similar to deduplication of other data blocks, as discussed herein.

Block Reference Count

As discussed above, with deduplication and also with data packing, a block may be referenced (shared) by two or more entities. A mechanism therefore is needed to track the references for each block. Typically, the references are tracked using a reference count, and a block cannot be deleted unless and until the reference count reaches zero (i.e., when the last entity that references the block is deleted).

While the present invention is not limited to any particular mechanism for tracking the reference count for each block, in certain embodiments, the reference count is tracked using a bitmap having multiple bits associated with each block. In certain exemplary embodiments, the bitmap is the modified version of an existing Free Space Bitmap (FSB) that is used to track not only the status of the block (e.g., used vs. free, which in the original FSB involved two bits per block) but also the reference count. For convenience, such a bitmap is referred to herein as a "Reference Counted Bitmap" or "RCB." For example, the RCB may include four or eight bits per block encoded so as to represent the block status (e.g., used vs. free) and the reference count. The following is but one exemplary encoding scheme using eight bits per block that allows for both deduplication and root onode packing with up to eight root onodes per block:

Value=0: block is unallocated
Value=[1, 239 (0xEF)]: reference count for a regular or snapshot block
Value=[240 (0xF0), 247 (0xF7)]: reference count for a packed block (reference count 1 to 8)
Value=248 (0xF8) to 255 (0xFF): unused/reserved Alternatively, a separate bitmap or other data structure may be used to track the reference count for each block.

Enhanced Deduplication

In certain exemplary embodiments, the process of deduplication need not be abandoned when the previously indexed chunk is no longer associated with its original object (e.g., because the original object associated with the previously indexed chunk has been deleted or truncated). Instead, a separate data structure may be maintained per filesystem that contains a linked list of the block(s) in an indexed chunk. This data structure may be kept in a well-known object per filesystem. When a duplicate is detected by the deduplication detection/indexing engine 213 as discussed above, then this data structure may be used to locate the block(s) associated with the previously indexed chunk, which then can be examined to determine if the block(s) can be used to deduplicate the candidate chunk (e.g., that the contents of the block(s) have not changed). If the previously indexed chunk is used for deduplicating the candidate chunk, then the reference count associated with each block is incremented, and a block then cannot be freed unless and until it is no longer being referenced.

Handling Deduplication in a Multitiered Filesystem

In certain exemplary embodiments, the filesystem may be a multitiered filesystem (MTFS), for example, as described in U.S. patent application Ser. No. 13/043,837, which is hereby incorporated herein by reference in its entirety. MTFS can improve performance by placing filesystem metadata on faster storage (metadata tier).

Preferably, deduplication will not allow user objects to share blocks used for filesystem metadata in the metadata tier, for if this were allowed, then it is possible that the user object might hold on to the block in the metadata tier even after the block has stopped being part of the filesystem's metadata.

It should be noted that it generally would be acceptable for metadata to share blocks in the user data tier.

Handling Resilient Objects

Certain exemplary embodiments may support so-called "resilient" objects, where a resilient object is a filesystem object for which two complete copies of the object are stored. Such resilient objects may be deduplicated, although they should not be deduplicated in such a way that any blocks are shared by the two copies (which essentially would remove the resilient nature of the object). Thus, when deduplicating a resilient object, the system will ensure that the two copies do not end up pointing to the same data on disk.

NVRAM Reservation

In certain exemplary embodiments, none of the modify operations performed during deduplication will be logged to the NVRAM. This means that in case of a crash, the ensuing rollback will erase all deduplication that occurred in the file system after the last checkpoint.

Deduplication of Multiple Filesystems

Deduplication of multiple filesystems can be handled in various ways, such as, for example using a single index for multiple filesystems or using a separate index for each filesystem. Certain exemplary embodiments will use the latter approach.

Snapshot Restore File

In certain exemplary embodiments, a snapshot copy of an object may be restored by allocating a new object number in the live file system and then making the object's onode tree and block pointers be shared with the file in the snapshot. Each shared block would need to have its reference count incremented. If a block that is at its maximum reference count is encountered, the block would be copied, with the live object updated to point to the copied block. This new object would be inserted into the live file system directory tree, allowing for both the original and snapshot restored object to co-exist if required. A flag may be included in the root onode to indicate that the object has been snapshot restored. Modification of the live object may be allowed while incrementing the reference counts of the shared blocks as needed.

Alternative Chunk Sizes for Deduplication

In exemplary embodiments described above, each chunk encompassed a single block of a given filesystem object, which, from an implementational standpoint, provided a number of simplifications for deduplication that will become apparent from the following discussion of alternative embodiments in which each chunk encompasses multiple blocks (e.g., four or eight blocks per chunk).

Since the deduplication detection/indexing engine essentially can index a fixed number of chunks for a given amount of allocated memory, a larger chunk size allows for indexing over a larger amount of data, although the larger chunk size may reduce the likelihood of detecting duplicates in some situations (e.g., the likelihood of matching a 4K chunk of data generally might be higher than matching a 256K chunk of data).

In certain exemplary embodiments having multiple blocks per chunk, objects are divided into chunks according a predetermined scheme. For example, the object may be divided sequentially into N-block chunks, e.g., blocks 1-N, blocks (N+1)-2N, etc.

In order to integrate such multiple-block chunks into the deduplication scheme described above, each chunk must be assigned a checkpoint number. In certain exemplary embodiments, the chunk checkpoint number is the checkpoint number of the block having the highest checkpoint number.

Also, when a multiple-block chunk is deduplicated, the object associated with the candidate chunk must be updated to replace references to all of the blocks in the candidate chunk with corresponding references from the previously indexed chunk. The block reference counts typically would be handled on a block-by-block basis (as opposed to a chunk basis), such that only blocks that have not reached the maximum reference count can be shared.

Alternative Deduplication Management

In exemplary embodiments described above, deduplication is performed as a background function, both the detection of modified chunks and the deduplication of duplicate chunks. The inventors recognize, however, that other types of deduplication management are possible. For example, in one alternative, deduplication may occur synchronously in the write path as chunks are modified such that, as writes come in, the chunks are hashed and processed by the deduplication detection/indexing engine, and if a duplicate is detected, it is deduplicated as part of the write operation. Such synchronous deduplication would introduce latency into the write path, which can negatively impact performance of the filesystem. In another alternative, deduplication may be performed in a "hybrid" synchronous/asynchronous manner such that as writes come in, the chunks are hashed and processed by the deduplication detection/indexing engine (as in the synchronous solution above) while the chunks themselves are written to storage (as in a full-background deduplication process), and if a duplicate is detected, it is deduplicated later in the background.

Alternative Uses of the Hash Generator

In certain embodiments of the present invention, the hardware-based system 220 is configured so that the hash generator 222 can be invoked by the software-based system and/or by the hardware-based system for other hash-based functions in addition to, or in lieu of, deduplication, such as, for example, for IPsec, SMB2 signing, HCP external migration, or other functions that utilize SHA-256 hashes.

Miscellaneous

Deduplication and data packing features are described above. These mechanisms should be considered mutually exclusive of one another, i.e., certain embodiments might implement deduplication but not data packing, certain other embodiments might implement data packing but not deduplication, and still other embodiments might implement both deduplication and data packing. Preferably, a reference count mechanism (e.g., a Reference Counted Bitmap or other mechanism) capable of being used for both deduplication and data packing is implemented in exemplary embodiments, for example, to allow for future addition of one or both features.

While exemplary embodiments are described above with reference to a commercially-available deduplication detection/indexing engine that is integrated into the software-based system 210, it should be noted that various alternative embodiments may implement the deduplication detection/indexing engine as part of the software-based deduplication manager or as part of the hardware-based filesystem manager. When the deduplication detection/indexing engine is implemented as part of the hardware-based filesystem manager, the hardware-based filesystem manager typically would invoke the deduplication detection/indexing engine after the hash value is generated for a candidate chunk without passing the hash value to the software-based deduplication manager.

It should be noted that arrows may be used in drawings to represent communication, transfer, or other activity involving two or more entities. Double-ended arrows generally indicate that activity may occur in both directions (e.g., a command/request in one direction with a corresponding reply back in the other direction, or peer-to-peer communications initiated by either entity), although in some situations, activity may not necessarily occur in both directions.

Single-ended arrows generally indicate activity exclusively or predominantly in one direction, although it should be noted that, in certain situations, such directional activity actually may involve activities in both directions (e.g., a message from a sender to a receiver and an acknowledgement back from the receiver to the sender, or establishment of a connection prior to a transfer and termination of the connection following the transfer). Thus, the type of arrow used in a particular drawing to represent a particular activity is exemplary and should not be seen as limiting.

It should be noted that headings are used above for convenience and are not to be construed as limiting the present invention in any way.

It should be noted that terms such as "client and" "server" may be used herein to describe devices that may be used in certain embodiments of the present invention and should not be construed to limit the present invention to any particular device type unless the context otherwise requires. Thus, a device may include, without limitation, a node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

Exemplary embodiments described above include both computer program logic for use with a processor (e.g., a microprocessor, microcontroller, digital signal processor, or general purpose computer) and hardware-based logic. Hardware-based logic may include programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. Computer program logic implementing some or all of the described functionality is typically implemented as a set of computer program instructions that is converted into a computer executable form, stored as such in a computer readable medium, and executed by a microprocessor under the control of an operating system. Hardware-based logic implementing some or all of the described functionality may be implemented using one or more appropriately configured FPGAs.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The present invention may be embodied in other specific forms without departing from the true scope of the invention, and numerous variations and modifications will be apparent to those skilled in the art based on the teachings herein. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A non-transitory computer-readable storage medium storing a computer program comprising computer-readable program instructions which, when running on or loaded into a file system server or into a computer connected to a file system server or when being executed by one or more processors or processing units of the file system server or the computers, cause the file system server to execute a method for managing a file system in a data storage system comprising the file system server;

the method comprising:
managing a current version of the file system and a plurality of snapshot copies of the file system, each snapshot copy being a respective checkpoint version of the file system taken by a checkpoint mechanism at a respective checkpoint of a series of checkpoints, and
executing a deduplication process for identifying and de-duplicating candidate data units for deduplication in the file system;
the deduplication process including:
identifying a snapshot copy of the file system at a second checkpoint that is later in time than a first checkpoint;
identifying data units, which have been modified from the first checkpoint until the second checkpoint, as candidate data units for deduplication, and
processing one or more first data units selected from only the identified candidate data units for deduplication.

2. The non-transitory computer-readable storage medium storing a computer program according to claim 1, wherein the one or more first data units are identified based on a condition that the identified candidate data units have not been modified or excluded from their associated file system objects of the current version of the file system since the second checkpoint of the snapshot copy.

3. The non-transitory computer-readable storage medium storing a computer program according to claim 1, wherein processing the one or more first data units includes de-duplicating the one or more first data units based on a condition that the one or more first data units are determined to be a duplicate of one or more previously indexed data units and upon validating both the one or more previously indexed data units and the one or more first data units based on checkpoint numbers associated with checkpoints of the series of checkpoints to ensure that the one or more previously indexed data units and the one or more first data units are unchanged and still in use.

4. The non-transitory computer-readable storage medium storing a computer program according to claim 1, wherein identifying candidate data units for deduplication in the file system includes identifying changed file system objects in the file system and identifying changed data blocks within such changed file system objects using checkpoint numbers associated with checkpoints of the series of checkpoints.

5. The non-transitory computer-readable storage medium storing a computer program according to claim 1, wherein the file system includes a plurality of file system objects, each file system object being implemented using a respective tree structure including an object root node and optionally including indirect nodes, direct nodes and data blocks.

6. The non-transitory computer-readable storage medium storing a computer program according to claim 5, wherein identifying candidate data units for deduplication in the file system includes walking an object tree structure of a respective file system object to identify candidate data blocks that have changed within a checkpoint range of checkpoints of the series of checkpoints or to identify candidate data blocks that have diverged from an original file system object if the respective file system object is a cloned object.

7. The non-transitory computer-readable storage medium storing a computer program according to claim 5, wherein the object root node of each respective file system object includes a checkpoint number to identify the checkpoint in which the respective file system object was last modified, and wherein identifying candidate data units for deduplication in the file system includes identifying changed file system objects in the file system based on checkpoint numbers.

8. The non-transitory computer-readable storage medium storing a computer program according to claim 5, wherein the object root node of each respective file system object includes a creation checkpoint number to identify the checkpoint in which the respective file system object was created, and wherein identifying candidate data units for deduplication in the file system includes identifying all data units associated with created file system objects in the file system based on creation checkpoint numbers.

9. The non-transitory computer-readable storage medium storing a computer program according to claim 5, wherein each node of a respective tree structure of a respective file system object includes one or more pointers to reference a data block or another node, and each pointer is associated with a checkpoint number to indicate a checkpoint associated with the referenced data block or the referenced other node, and identifying candidate data units for deduplication in the file system includes identifying changed file system objects in the file system based on checkpoint numbers.

10. The non-transitory computer-readable storage medium storing a computer program according to claim 1, wherein the deduplication process includes determining whether a particular identified candidate data unit is a duplicate of another data unit in the file system, and, if the identified candidate data unit is a duplicate data unit of the other data unit in the file system, replacing the duplicate data unit with a reference to the other data unit in the file system.

11. The non-transitory computer-readable storage medium storing a computer program according to claim 1, wherein the deduplication process is performed in duplication cycles based on a duplication condition being at least one of:
a predetermined number of blocks have been modified in the file system, and
a predetermined number of checkpoints have been taken.

12. The non-transitory computer-readable storage medium storing a computer program according to claim 11, wherein each duplication cycle covers a predetermined range of checkpoint numbers associated with checkpoints of the series of checkpoints.

13. The non-transitory computer-readable storage medium storing a computer program according to claim 1, wherein a respective candidate data unit includes a single data block of a respective file system object of the file system, or a respective candidate data unit includes a plurality of data blocks of a respective file system object of the file system.

14. A method for managing a file system in a data storage system comprising a file system server, comprising:
managing a current version of the file system and a plurality of snapshot copies of the file system, each snapshot copy being a respective checkpoint version of the file system taken by a checkpoint mechanism at a respective checkpoint of a series of checkpoints, and
executing a deduplication process for identifying and de-duplicating candidate data units for deduplication in the file system;
the deduplication process including:
identifying a snapshot copy of the file system at a second checkpoint that is later in time than a first checkpoint;
identifying data units, which have been modified after the first checkpoint until the second checkpoint, as candidate data units for deduplication, and
processing one or more first data units selected from only the identified candidate data units for deduplication.

15. The method according to claim 14, wherein the one or more first data units are is identified based on a condition that the identified candidate data units have not been modified or excluded from their associated file system objects of the current version of the file system since the second checkpoint of the snapshot copy.

16. The method according to claim 14, wherein processing the one or more first data units includes de-duplicating the one or more first data units based on a condition that the one or more first data units are determined to be a duplicate of one or more previously indexed data units and upon validating both the one or more previously indexed data units and the one or more first data units based on checkpoint numbers associated with checkpoints of the series of checkpoints to ensure that the one or more previously indexed data units and the one or more first data units are unchanged and still in use.

17. The method according to claim 14, wherein identifying candidate data units for deduplication in the file system includes identifying changed file system objects in the file system and identifying changed data blocks within such changed file system objects using checkpoint numbers associated with checkpoints of the series of checkpoints.

18. A data storage system configured to manage a file system, comprising a file server being adapted to execute:
managing a current version of the file system and a plurality of snapshot copies of the file system, each snapshot copy being a respective checkpoint version of the file system taken by a checkpoint mechanism at a respective checkpoint of a series of checkpoints, and
executing a deduplication process for identifying and de-duplicating candidate data units for deduplication in the file system;
the deduplication process including:
identifying a snapshot copy of the file system at a second checkpoint that is later in time than a first checkpoint;
identifying data units, which have been modified after the first checkpoint until the second checkpoint, as candidate data units for deduplication, and
processing one or more first data units selected from only the identified candidate data units for deduplication.

19. The data storage system according to claim 18, wherein the one or more first data units are identified based on a condition that the identified candidate data units have not been modified or excluded from their associated file system objects of the current version of the file system since the second checkpoint of the snapshot copy.

20. The data storage system according to claim 18, wherein processing the one or more first data units includes de-duplicating the one or more first data units based on a condition that the one or more first data units are determined to be a duplicate of one or more previously indexed data units and upon validating both the one or more previously indexed data units and the one or more first data unit based on checkpoint numbers associated with checkpoints of the series of checkpoints to ensure that the one or more previously indexed data units and the one or more first data units are unchanged and still in use.

21. The data storage system according to claim 18, wherein identifying candidate data units for deduplication in the file system includes identifying changed file system objects in the file system and identifying changed data blocks within such changed file system objects using checkpoint numbers associated with checkpoints of the series of checkpoints.

22. The data storage system according to claim 18, wherein the file system includes a plurality of file system objects, each file system object being implemented using a respective tree structure including an object root node and optionally including indirect nodes, direct nodes and data blocks.

23. The data storage system according to claim 22, wherein identifying candidate data units for deduplication in the file system includes walking an object tree structure of a respective file system object to identify candidate data blocks that have changed within a checkpoint range of checkpoints of the series of checkpoints or to identify candidate data blocks that have diverged from an original file system object if the respective file system object is a cloned object.

24. The data storage system according to claim 22, wherein the object root node of each respective file system object includes a checkpoint number to identify the checkpoint in which the respective file system object was last modified, and wherein identifying candidate data units for deduplication in the file system includes identifying changed file system objects in the file system based on checkpoint numbers.

25. The data storage system according to claim 22, wherein the object root node of each respective file system object includes a creation checkpoint number to identify the checkpoint in which the respective file system object was created, and wherein identifying candidate data units for deduplication in the file system includes identifying all data units associated with created file system objects in the file system based on creation checkpoint numbers.

26. The data storage system according to claim 22, wherein each node of a respective tree structure of a respective file system object includes one or more pointers to reference a data block or another node, and each pointer is associated with a checkpoint number to indicate a checkpoint associated with the referenced data block or the referenced other node, and identifying candidate data units for deduplication in the file system includes identifying changed file system objects in the file system based on checkpoint numbers.

27. The data storage system according to claim 18, wherein the deduplication process includes determining whether a particular identified candidate data unit is a duplicate of another data unit in the file system, and, if the identified candidate data unit is a duplicate data unit of the other data unit in the file system, replacing the duplicate data unit with a reference to the other data unit in the file system.

28. The data storage system according to claim 18, wherein the deduplication process is performed in duplication cycles based on a duplication condition being at least one of:
   a predetermined number of blocks have been modified in the file system, and
   a predetermined number of checkpoints have been taken.

29. The data storage system according to claim 28, wherein each duplication cycle covers a predetermined range of checkpoint numbers associated with checkpoints of the series of checkpoints.

30. The data storage system according to claim 18, wherein a respective candidate data unit includes a single data block of a respective file system object of the file system, or a respective candidate data unit includes a plurality of data blocks of a respective file system object of the file system.

\* \* \* \* \*